(12) United States Patent
Castell et al.

(10) Patent No.: US 9,390,413 B2
(45) Date of Patent: *Jul. 12, 2016

(54) SYSTEM AND METHOD FOR MAKING ELECTRONIC PAYMENTS FROM A WIRELESS MOBILE DEVICE

(75) Inventors: David Castell, Waterloo (CA); Eric Chan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,762

(22) Filed: Sep. 30, 2011

(65) Prior Publication Data

US 2012/0084204 A1 Apr. 5, 2012

Related U.S. Application Data

(63) Continuation of application No. 12/116,171, filed on May 6, 2008, now Pat. No. 8,060,413.

(60) Provisional application No. 61/036,593, filed on Mar. 14, 2008.

(51) Int. Cl.
*H04M 11/00* (2006.01)
*G06Q 20/32* (2012.01)
(Continued)

(52) U.S. Cl.
CPC .......... *G06Q 20/3229* (2013.01); *G06Q 20/105* (2013.01); *G06Q 20/32* (2013.01);
(Continued)

(58) Field of Classification Search
CPC . G06Q 20/105; G06Q 20/32; G06Q 20/3229; G06Q 20/3572; G06Q 30/0601; G06Q 20/367; G06Q 20/382; G06Q 20/4014; G06Q 20/40145; G06Q 20/363; G06Q 30/0621; G06Q 20/322; G06Q 20/3223; G06Q 20/223; G06Q 40/02; H04L 67/02; H04L 2463/102; H04M 15/68; H04W 4/00; H04W 12/06; H04W 4/24

USPC ......... 379/91.01, 93.12; 455/403, 414.1, 425; 705/14.1, 14.23, 14.51, 14.64, 41, 51, 705/52, 53, 64, 65, 66, 67, 68, 69, 73, 75, 705/76, 77
See application file for complete search history.

(56) References Cited

U.S. PATENT DOCUMENTS 6,125,352 A 9/2000 Franklin et al.
6,697,839 B2 2/2004 Sini et al.
(Continued)

FOREIGN PATENT DOCUMENTS

EP 1168264 A2 1/2002
EP 1237132 A2 9/2002
(Continued)

OTHER PUBLICATIONS

International Search Report and Written Opinion dated Nov. 27, 2008 from WO2009111857.
(Continued)

*Primary Examiner* — Timothy Pham
(74) *Attorney, Agent, or Firm* — Jon Gibbons; Fleit Gibbons Gutman Bongini & Bianco P.L.

(57) ABSTRACT

An electronic device, system and method are provided for populating an online payment form. An electronic wallet resident on an electronic device stores data for at least one payment card. A transcoding proxy receives an online payment form from a website of an online vendor, and the electronic wallet is invoked to access data for one of the payment cards. The data is provided to the transcoding proxy, which populates the online payment form. One of the payment cards may be pre-selected for use with a given vendor.

20 Claims, 6 Drawing Sheets

(51) Int. Cl.
*G06Q 20/10* (2012.01)
*G06Q 20/34* (2012.01)
*G06Q 20/36* (2012.01)
*G06Q 20/38* (2012.01)
*G06Q 20/40* (2012.01)
*G06Q 30/06* (2012.01)
*G06Q 40/00* (2012.01)

(52) U.S. Cl.
CPC .......... *G06Q20/3572* (2013.01); *G06Q 20/363* (2013.01); *G06Q 20/367* (2013.01); *G06Q 20/382* (2013.01); *G06Q 20/4014* (2013.01); *G06Q 20/40145* (2013.01); *G06Q 30/0601* (2013.01)

(56) References Cited

U.S. PATENT DOCUMENTS

| | | | |
|---|---|---|---|
| 6,873,974 B1 * | 3/2005 | Schutzer | G06Q 20/10 235/379 |
| 7,188,110 B1 | 3/2007 | Ludtke et al. | |
| 7,206,998 B2 * | 4/2007 | Pennell et al. | 715/224 |
| 7,275,685 B2 | 10/2007 | Gray et al. | |
| 7,433,926 B1 | 10/2008 | Lusher et al. | |
| 7,483,845 B2 * | 1/2009 | Vetelainen | 705/67 |
| 7,819,307 B2 | 10/2010 | Lyons et al. | |
| 8,060,413 B2 * | 11/2011 | Castell et al. | 705/26.1 |
| 2002/0013788 A1 | 1/2002 | Pennell et al. | |
| 2002/0065774 A1 * | 5/2002 | Young et al. | 705/41 |
| 2002/0077993 A1 | 6/2002 | Immonen et al. | |
| 2002/0107755 A1 * | 8/2002 | Steed et al. | 705/26 |
| 2002/0194137 A1 * | 12/2002 | Park et al. | 705/64 |
| 2003/0018587 A1 | 1/2003 | Althoff et al. | |
| 2003/0220095 A1 | 11/2003 | Engelhart | |
| 2004/0122768 A1 | 6/2004 | Creamer et al. | |
| 2004/0177005 A1 | 9/2004 | Poltorak | |
| 2006/0169768 A1 * | 8/2006 | Gangi | 235/380 |
| 2007/0257105 A1 * | 11/2007 | Owen et al. | 235/380 |
| 2008/0172598 A1 * | 7/2008 | Jacobsen et al. | 715/224 |
| 2008/0270253 A1 * | 10/2008 | Huang | 705/26 |
| 2009/0089176 A1 * | 4/2009 | McCabe | 705/26 |
| 2009/0233579 A1 | 9/2009 | Castell et al. | |

FOREIGN PATENT DOCUMENTS

| | | |
|---|---|---|
| WO | 0148673 A1 | 7/2001 |
| WO | 2006085805 A1 | 8/2006 |
| WO | WO-2009111857 A1 | 9/2009 |

OTHER PUBLICATIONS

International Preliminary Report on Patentability dated Sep. 23, 2010 from WO2009111857.
International Search Report and Written Opinion dated Dec. 3, 2008 from WO2009111856.
International Preliminary Report on Patentability dated Sep. 23, 2010 from WO2009111856.
Extended European Search Report dated Sep. 22, 2011 from EP08748275.8.
Extended European Search Report dated Sep. 22, 2011 from EP08748310.3.
"Canadian Application Serial No. 2,718,515, Response filed Jul. 10, 2013 to Office Action mailed Jan. 11, 2013", 3 pgs.
"U.S. Appl. No. 12/116,171, Non Final Office Action mailed Apr. 12, 2011", 16 pgs.
"U.S. Appl. No. 12/116,171, Non Final Office Action mailed Nov. 26, 2010", 18 pgs.
"U.S. Appl. No. 12/116,171, Notice of Allowance mailed Jun. 30, 2011", 7 pgs.
"U.S. Appl. No. 12/116,171, Response filed Feb. 16, 2011 to Non Final Office Action mailed Jan. 26, 2010", 11 pgs.
"U.S. Appl. No. 12/116,171, Response filed Jun. 8, 2011 to Final Office Action mailed Apr. 12, 2011", 6 pgs.
"Canadian Application Serial No. 2,718,515, Office Action mailed Jan. 11, 2013", 2 pgs.
"European Application Serial No. 08748310.3, Response filed Oct. 18, 2012 to Office Action mailed Jun. 18, 2012", 4 pgs.
"European Application Serial No. 08748310.3, Examination Notification Art. 94(3) mailed Jun. 3, 2014", 6 pgs.

* cited by examiner

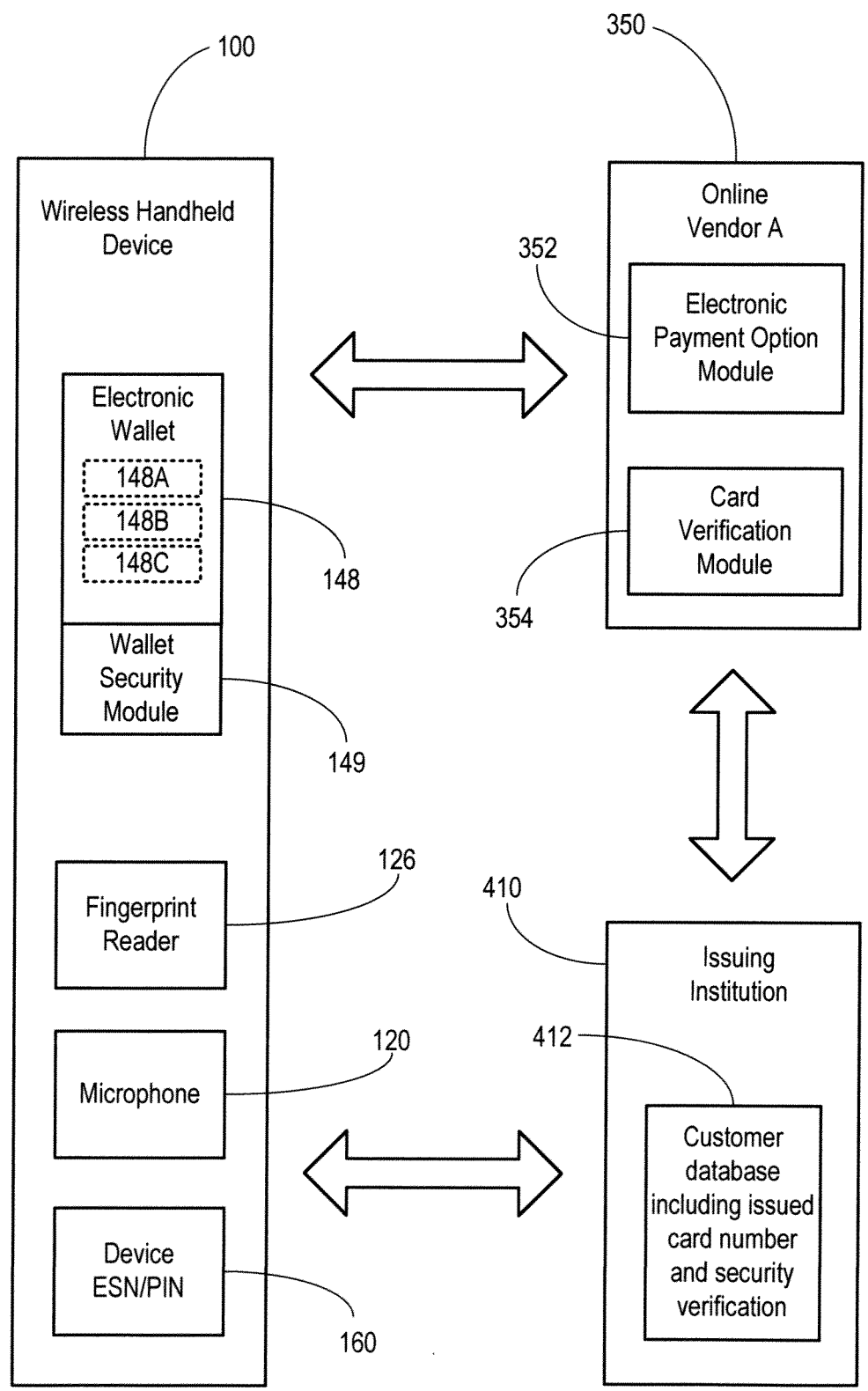
FIG. 4 — 400

SYSTEM AND METHOD FOR MAKING ELECTRONIC PAYMENTS FROM A WIRELESS MOBILE DEVICE

RELATED APPLICATION INFORMATION

This application is a continuation of U.S. patent application Ser. No. 12/116,171 filed May 6, 2008 and claims the benefit of U.S. Provisional Patent Application No. 61/036,593 filed Mar. 14, 2008, the disclosure of which is incorporated herein by reference in its entirety.

FIELD OF THE INVENTION

The present disclosure relates generally to electronic commerce, and more particularly to systems and methods for making electronic payments.

BACKGROUND

Currently, there are a number of ways in which online transactions may be made via a wireless mobile device. For example, using an Internet browser, a user of the wireless mobile device may browse an online store, and the store may allow the user to create a name/password and to save the credit card information at the online store for future purchases. As another example, a device-based catalogue application (such as Handango's InHand™ client or 30 Second Software's Digby™ client) may allow the user to store credit card information within the catalogue application, and control user access by using an access password for the catalogue application. As a further example, form-filler functionality may be provided on the wireless mobile device with credit card support (e.g. Windows Live™ Toolbar includes credit card form filling options with a password protection).

BRIEF DESCRIPTION OF THE DRAWINGS

In the figures which illustrate exemplary embodiments:

FIG. 4 shows a schematic block diagram of an illustrative electronic purchase system that may be conducted using the wireless mobile device and an electronic wallet in accordance with an embodiment.

DETAILED DESCRIPTION

As noted above, the present disclosure relates to a system and method for making electronic payments.

Prior approaches may have limitations in that entry of credit card information may have to be repeated for each website or application, and that secure use of the cards may involve a different transaction process for each website or application. What is needed is an improved system and method for making payment from a wireless mobile device using an electronic wallet.

Figure 1:
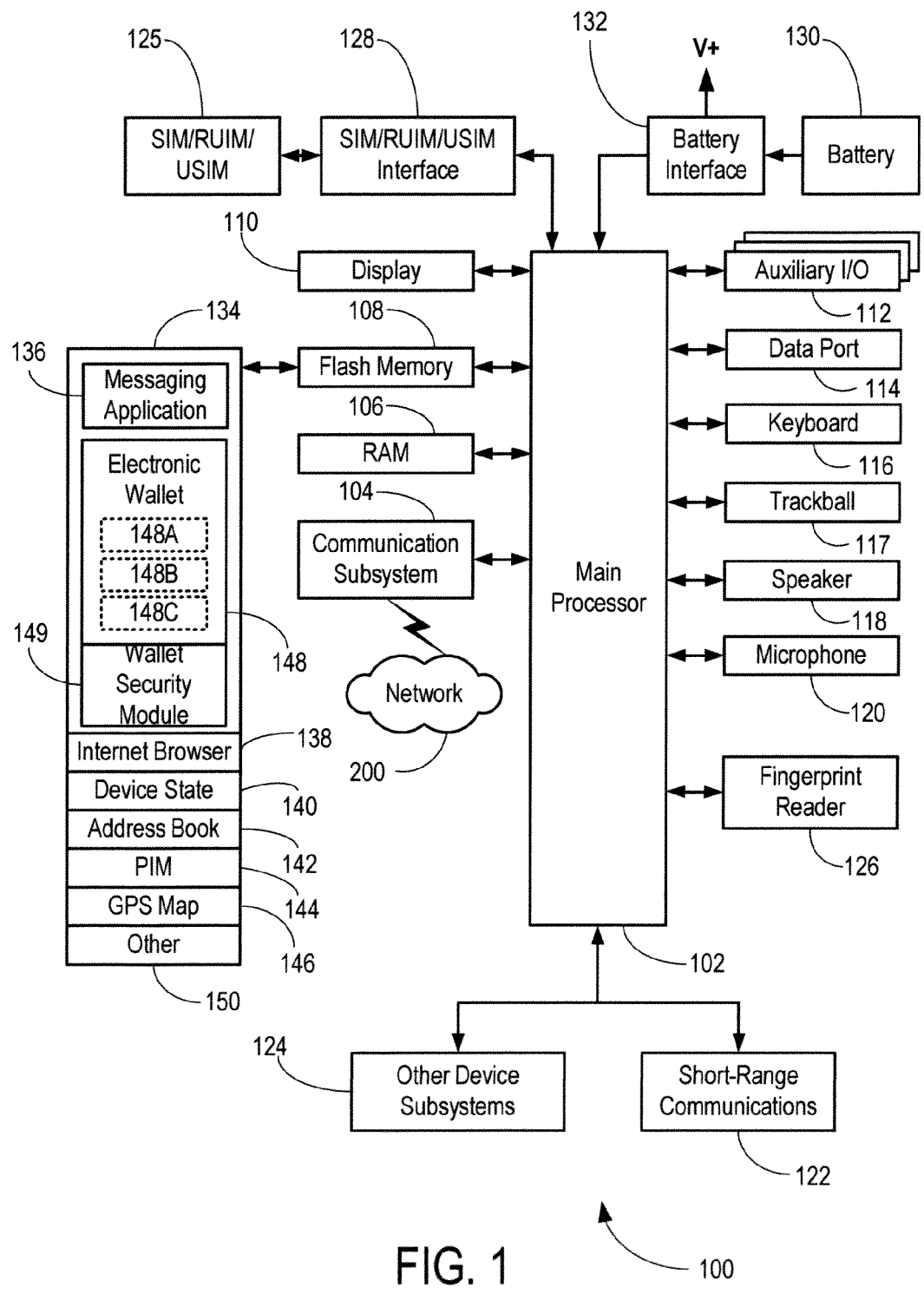
FIG. 1 is an illustration of a device in accordance with an embodiment.

In an illustrative embodiment, the system and method may be practiced with a wireless mobile device in a wireless operating environment. Shown in FIG. 1 is a schematic block diagram of an illustrative wireless mobile device 100. The wireless mobile device 100 may comprise a number of components, including a main processor 102 which controls the overall operation of wireless mobile device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, other device subsystems 124, SIM/RUIM/USIM card 125 connected via a SIM/RUIM/USIM interface 128, and a fingerprint reader module 126. In some embodiments, the keyboard 116 may comprise a virtual keyboard or a physical keyboard or both. In some embodiments, the display 110 may comprise a touchscreen display.

Some of the subsystems of the wireless mobile device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing for the trackball to be depressed, to allow selection of a highlighted item.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The wireless mobile device 100 may send and receive communication signals over the wireless network 200 after required network registration or activation procedures have been completed. Network access may be associated with a subscriber or user of the wireless mobile device 100.

The wireless mobile device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the wireless mobile device 100. The battery 130 may be used to power all components and modules in the wireless mobile device 100. In some embodiments, the communication device 100 may be solar powered or otherwise powered with or without use of a battery.

The main processor 102, in addition to its operating system functions, enables execution of various software applications 134 on the wireless mobile device 100. A subset of software applications 134 that control basic device operations, including data and voice communication applications, will normally be installed on the wireless mobile device 100 during its manufacture.

The software applications 134 may include a messaging application 136. The messaging application 136 can be any suitable software program that allows a subscriber or user of the wireless mobile device 100 to send and receive wireless text communications. Various alternatives exist for the messaging application 136 as is well known to those skilled in the art. Messages that have been sent or received by the user are typically stored in local storage such as flash memory 108 of the wireless mobile device 100, or in some other suitable storage element in the wireless mobile device 100. In an alternative embodiment, some of the sent and received messages may be stored remotely from the wireless mobile device 100 such as in a data store of an associated host system that the wireless mobile device 100 communicates with. In an embodiment, the messaging application 136 may include a Message List user interface that is configured to allow a user to see a list of message objects (i.e. email messages) in a convenient list form. This will be described in detail further below.

Still referring to FIG. 1, wireless mobile device 100 may include an electronic wallet 148 that may be operatively integrated with main processor 102, RAM 106, display 110, short-range communications subsystem 122, fingerprint reader module 126, or various other device subsystems 124 and software applications 134 to provide various electronic wallet application functions.

To identify a user, the communications device 100 may use a SIM/RUIM/USIM card 125 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 125 is one type of a conventional "smart card" that can be used to identify a user of the communications device 100 and to personalize the communications device 100, among other things. Without the SIM/RUIM/USIM card 125, the communications device 100 may not be fully operational for communication with the wireless network 200, in some embodiments. By inserting the SIM/RUIM/USIM card 125 into the SIM/RUIM/USIM interface 128, a user can access subscribed services. Such subscribed services may include, for example, web browsing and messaging such as email, voice mail, Short Message Service (SMS), and Multimedia Messaging Services (MMS).

The wireless mobile device 100 may further include a device state module 140, an address book module 142, a Personal Information Manager (PIM) module 144, and various other modules 150. Additional software applications may also be loaded onto the wireless mobile device 100 through at least one of the wireless network 200, the auxiliary 110 subsystem 112, the data port 114, the short-range communications subsystem 122, or the various other device subsystems 124.

Figure 2:
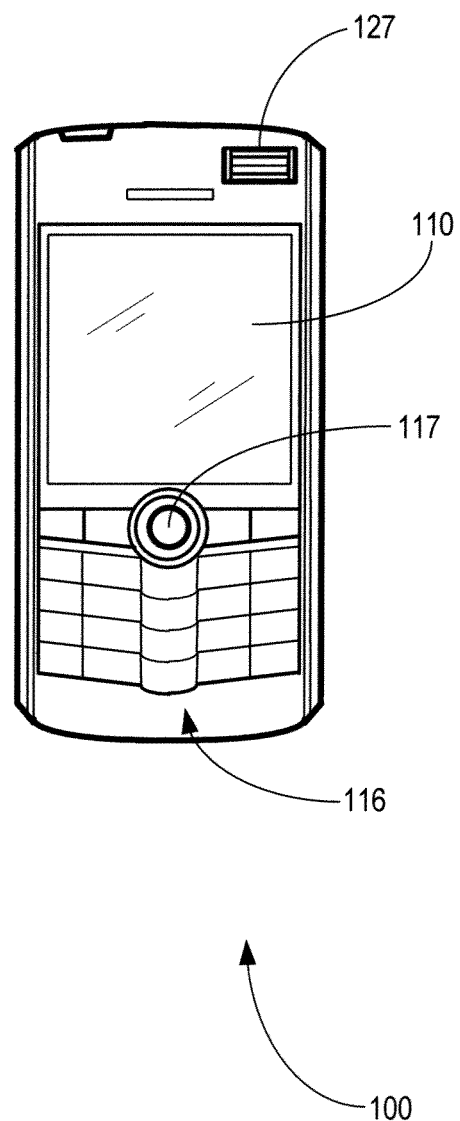
FIG. 2 is an illustrative example of a wireless mobile device that may provide an operating environment.

Now referring to FIG. 2, shown is an illustrative front view of a wireless mobile device 100 that may provide a suitable operating environment. In this particular example, mobile communication device 100 comprises a handheld smart phone; however, the scope of the present disclosure is not limited to a specific type of device. As shown, the wireless mobile device 100 may include a display 110, a keyboard 116, and other input or navigation means such as a trackball 117, and a fingerprint reader 127 operatively connected to the fingerprint reader module 126 of FIG. 1. The display 110 may be configured to display various screens allowing the user of device 100 to view screen outputs from the various software applications 134, including the electronic wallet 148. Display 110 may also be configured to provide a touch-sensitive screen input in response to a prompt or query displayed on display 110.

Figure 3:
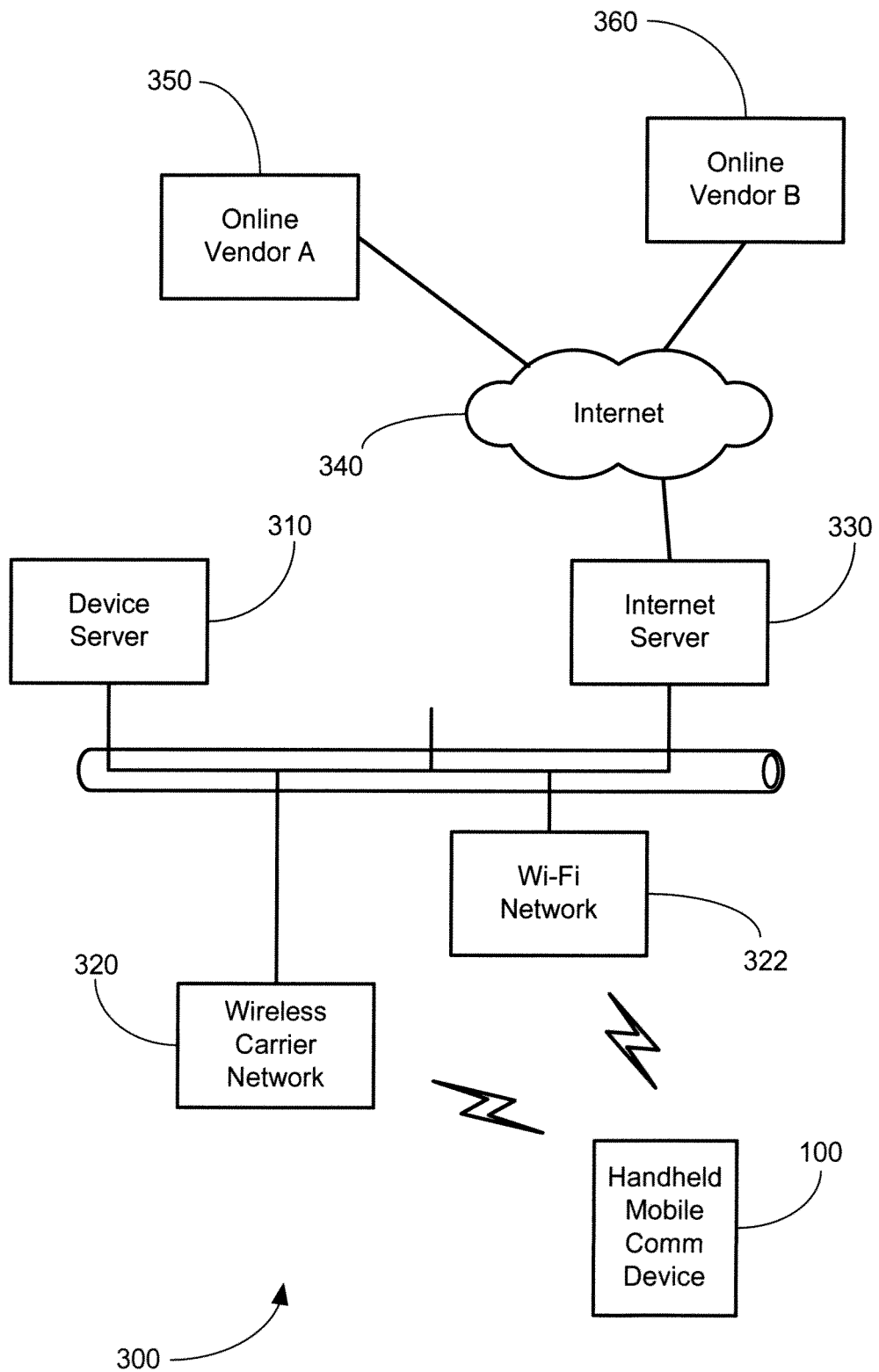
FIG. 3 is a block diagram of an illustrative example of a network environment in which various embodiments may be practiced.

Now referring to FIG. 3, shown is a schematic block diagram of an illustrative network environment 300 in which various embodiments may be practiced. As shown, network environment 300 may include a device server 310 operatively connected to the wireless mobile device 100 via a wireless carrier network 320, a Wi-Fi Network 322, or another suitable access point. Any data transferred between device server 310 and wireless mobile device 100 may be encrypted using algorithms such as Triple Data Encryption Standard (Triple DES) and Advanced Encryption Standard (AES), which use 112-bit keys and 256-bit keys respectively, to secure wireless communications.

An Internet server 330 may also be provided in the network environment 300 such that device 100 may access the Internet 340. In an embodiment, the Internet 340 may provide access to online vendors having web servers 350, 360 from which a user of wireless mobile device 100 may electronically purchase goods or services.

Now referring to FIG. 4, shown is a schematic block diagram 400 of an illustrative electronic purchase system that may be conducted using the wireless mobile device 100 and the electronic wallet 148 in accordance with an embodiment. As shown, in an embodiment, a user of wireless mobile device 100 may use the wireless mobile device 100 to visit an online vendor's website (e.g. hosted by online vendor A's web server 350) in order to browse for goods or services available for purchase. Electronic wallet 148 provided within wireless mobile device 100 can be configured to conveniently make electronic payments for online purchases. Accordingly, as will be described, the electronic wallet 148 may be configured to access storage means on a persistent store (e.g. flash memory 108) adapted to securely store data for one or more payment cards (e.g. credit cards or debit cards 148A, 148B, 148C) issued to the user of wireless mobile device 100. The electronic wallet 148 may further have an associated wallet security module 149 configured to allow controlled access to the electronic wallet 148. The payment cards 148A, 148B, 148C stored in the electronic wallet 148 may be encrypted using a strong encryption algorithm such as Triple DES or AES. These payment cards 148A, 148B, 148C may be made accessible by wallet security module 149 only if the wallet security module 149 receives verification that the user is authorized to access the payment cards 148A, 148B, 148C.

In an embodiment, wireless mobile device 100 may include a fingerprint reader 126 operatively connected to wallet security module 149, and configured to enable an authorized user access to payment cards 148A, 148B, 148C only if the fingerprint reader 126 receives fingerprint input data matching previously stored fingerprint input data from an authorized user (e.g. the main user of wireless mobile device 100). In other embodiments, other types of biometric data may be used to authenticate a user.

Alternatively, or in addition, wireless mobile device 100 may include a microphone 120 which may be adapted to receive a voice input signal from a user speaking a pre-selected password or command, and comparing the received voice input signal to a previously stored input signal from the authorized user.

In yet another embodiment, wallet security module 149 may be configured to enable authorized user access to payment cards 148A, 148B, 148C only if the user supplies a verifiable user name and password combination. It will now be appreciated by those skilled in the art that in other embodiments wallet security module 149 can be configured to employ various other methods of user authentication and that all of these embodiments are within the scope of the present disclosure.

In an embodiment, the online vendor may provide a web server 350 having an electronic payment module 352 suitably configured to enable purchases from the online vendor's website using the electronic wallet 148 present within wireless mobile device 100. The electronic payment module 352 may provide a user interface viewable on display 110 of wireless mobile device 100, and various menu options and controls may be presented for selection or activation using keyboard 116, trackball 117, or other methods of input that may be available. In order to simplify the purchasing transaction, the electronic payment module 352 may also be configured to provide a simplified user interface allowing the user to complete a purchase with a minimal number of steps, and without requiring repeated entry of card numbers, expiration dates, and other personal information or verification data each time the user is making a purchase at the online vendor's website.

In an illustrative embodiment, the electronic wallet 148 may register as a browser plug-in for a custom content type in Internet browser 138. When a browser plug-in is registered, support for custom content type may be indicated to an online vendor website supporting this method of payment via HTTP coding, and the online vendor website may return a webpage specially adapted for this payment option. In an embodiment, the returned webpage may then invoke the wallet by executing a wallet invocation procedure triggered by an instruction embedded in the HTTP header.

As an illustrative example, a MIME (Multimedia Internet Mail Extensions) type protocol may be embedded in the HTTP header of an online vendor webpage to invoke the electronic wallet 148. As will be appreciated, MIME is an Internet standard protocol used in email, but it is also important as instructions that may be embedded in communication protocols like HTTP. Thus, the triggering webpage may be, for example, a "check-out" page which may have a MIME instruction embedded in its HTTP header, such that proceeding to the check-out webpage on the browser 138 invokes the electronic wallet 148.

If custom content types are not used, as another illustrative example, scripting instructions such as JavaScript™ instructions may be used to invoke the electronic wallet 148. It will be appreciated that there are also various other ways in which the electronic wallet 148 may be invoked, such as meta tags and embedded mark-up. However, regardless of the particular way in which the electronic wallet 148 is invoked, the wireless mobile device 100 may be suitably adapted to recognize when an online vendor's web server 350 supports use of the electronic wallet 148 as a payment option when visiting the online vendor's web server 350.

Upon being invoked, wallet security module 149 initiates an authentication process that must be successfully completed by the user before the user can access the contents of the electronic wallet core 504. Without successful authentication, no further access to the electronic wallet application will be permitted. In an embodiment, the electronic wallet security module 149 may be adapted to also employ one or more authentication features as previously described, such as the fingerprint reader 126, and microphone 120. Various other authentication means may be employed in the alternative or in some combination, such as master passwords and authentication keys to access encrypted data stored in the electronic wallet 148.

Once a user has been authenticated by the wallet security module 149 to access the electronic wallet 148, the user may select a suitable card from the electronic wallet 148 for use in payment. The card information stored in the electronic wallet 148 is then retrieved and provided to the online vendor's website for payment.

In an alternative embodiment, rather than automatically invoking the electronic wallet 148 using meta-tags, embedded mark-up or custom content types, the online vendor's website as presented in the Internet browser 138 on display 110 may include a selectable link or payment button for payment specifically via the electronic wallet 148 provided on the wireless mobile device 100. Such a link or payment button may be provided at an online vendor's check-out webpage, and upon selection a suitable payment screen may be provided at the online vendor's site to interact with the electronic wallet 148. If necessary, the electronic wallet 148 may then be invoked by the user on wireless mobile device 100 by selecting a suitable menu option or icon.

In this embodiment, the user may further specify a payment type to be used (e.g. a certain type of credit card) for the transaction. If a user of wireless mobile device 100 clicks a payment button specifying use of the electronic wallet 148 and a specific card type XYZ, then the online vendor's web server 350 may then return a webpage specifically adapted for use with the specified card type XYZ. This may be done by having a number of different webpages available to handle payment for different card types such as XYZ.

When this webpage is loaded by the Internet browser 138 of wireless mobile device 100, an embedded custom content type may instruct the Internet browser 138 to invoke the electronic wallet application 148 with the specific card type selected by the user. The webpage specific to the card type selected may include a fillable form that may require specific details, including card number, name of the card holder, expiry date, card verification number, and telephone number, for example.

Before passing any payment card data to the requesting webpage, an authentication process is completed by wallet security module 149. For example, wallet security module 149 may ask the user for valid verification data to access the electronic wallet 148, such as a password input via keypad 116, a fingerprint press or swipe input via fingerprint reader 126, and/or a voice password or command input via microphone 120. The validation of the password, fingerprint, or voice input may be performed by wallet security module 149 locally on the wireless mobile device 100 in order to authorize transmission of data from the wireless mobile device 100. Alternatively, encrypted verification data may be transmitted together with the payment card data and payment information such that the encrypted verification data may be verified by the issuing institution 410, or by a trusted third party verification agent.

In another embodiment, the payment card data and payment information may be encrypted in a secure format which may be decrypted only by the final payment processing facility, such as by the originating payment card issuer. For example, the wireless mobile device 100 manufacturer and a payment card issuer may agree upon an end-to-end encryption format that would keep the payment card data secret as the payment card data passes through the online vendor's payment processing system (e.g. on the online vendor's web server). Once verified by the payment card issuer, a payment authorization code may be sent to the online vendor to confirm payment. This may significantly reduce the risk of payment card information being collected and inadvertently exposed or stolen from the online vendor's web site.

In another embodiment, wallet security module 149 may use the wireless mobile device 100's unique identification, such as an Electronic Serial Number (ESN) or Product Identification Number (PIN), to confirm validation and for the payment request. For example, when issuing the payment card 148A, 148B, 148C, the issuing institution 410 may specify the device ESN or PIN with which the payment card is associated. If a payment request is not originating from an authorized wireless mobile device 100, as evidenced by the ESN or PIN for example, the request for payment card verification by an online vendor's card verification module 354 may be refused. Thus, use of the unique identity of wireless mobile device 100 for verification may further enhance protection for cards carried in electronic wallet 148.

In another embodiment, if the wireless mobile device 100 is also configured as a mobile telephone, then the telephone number assigned to the wireless mobile device 100 may also be used to confirm authorized access, either alone, or in conjunction with the device ESN or PIN. If the telephone number of the wireless mobile device 100 is provided along with the payment card data and payment information, a call back to the telephone number may be used for further verification of the identity of the user (e.g. to ask for a password, code or confirm other personal information such as address, postal code, mother's maiden name, etc.). This may be useful, for example, if the payment card is close to the credit limit, and the payment card issuer needs to authorize a charge over that limit.

In an embodiment, once valid verification data has been input by the user, the user may be presented with a list of available payment options for selection. When displayed as selectable payment options, the card numbers could be fully revealed, partially hidden (e.g. 4500 xxxx xxxx 4742), or could simply be listed by the issuing institution's name (e.g. XYZ Bank Platinum Credit Card). Upon selection, card information for the selected card may be sent from the electronic wallet 148 in order to proceed with payment, or for the purposes of any further verification that the online vendor 350 may wish to conduct.

In another embodiment, instead of providing a web-based online store, if a vendor provides a device-based catalogue application that may be run on wireless mobile device 100, the catalogue application may be configured to provide a user interface on wireless mobile device 100 including a link to an online payment server (e.g. this could be on the vendor's website, or may be a third party payment processing server), and a menu item or button may be provided for making payment for a product in the catalogue application from the electronic wallet 148. When a user input such as selection of the menu option or a button is received, the catalogue application may be configured to call a system level API to invoke the electronic wallet 148 and the associated security module.

In an embodiment, upon being invoked, the wallet security module 149 may require the user to provide verification data, such as a password, fingerprint press or swipe, or voice command. Upon authorization, if a card has been pre-selected for use with the device-based catalogue application, electronic wallet 148 may pass all relevant card data and any verification data for processing the transaction. The user does not have to enter the card information at the online vendor's website to complete the transaction, and does not have to let the online vendor permanently store the card information on their website to achieve this.

In another embodiment, a transcoding proxy may be used that could convert a credit card form provided on an online vendor's website into a payment link or button. The transcoding proxy may also be configured to invoke the electronic wallet 148 and associated wallet security module 149, receive the payment card information at the proxy, and insert the data into the payment card form of the online vendor's site.

In another embodiment, a card carried in the electronic wallet 148 may be the only card available, or may be the card pre-selected for use with a particular online vendor or a device-based catalogue application running on the wireless mobile device 100. In this case, when wallet security module 149 authorizes access to the electronic wallet 148, the electronic wallet may be configured to automatically select the only available card or identify a pre-selected card for use in payment. Therefore, the number of steps for making a payment may be further reduced, and an authorized payment may be made, for example, simply with a finger press or swipe on fingerprint reader 126 by an authorized user.

As will be appreciated, with the electronic payment system and method described above, an electronic wallet 148 and a wallet security module 149 may be used as a common source of payment, and with a common payment process, for a variety of online vendor websites accessible via the Internet browser 138, various device-based catalogue applications, and various other applications running on wireless mobile device 100 or accessible via its wireless communication capabilities.

Figure 5A:
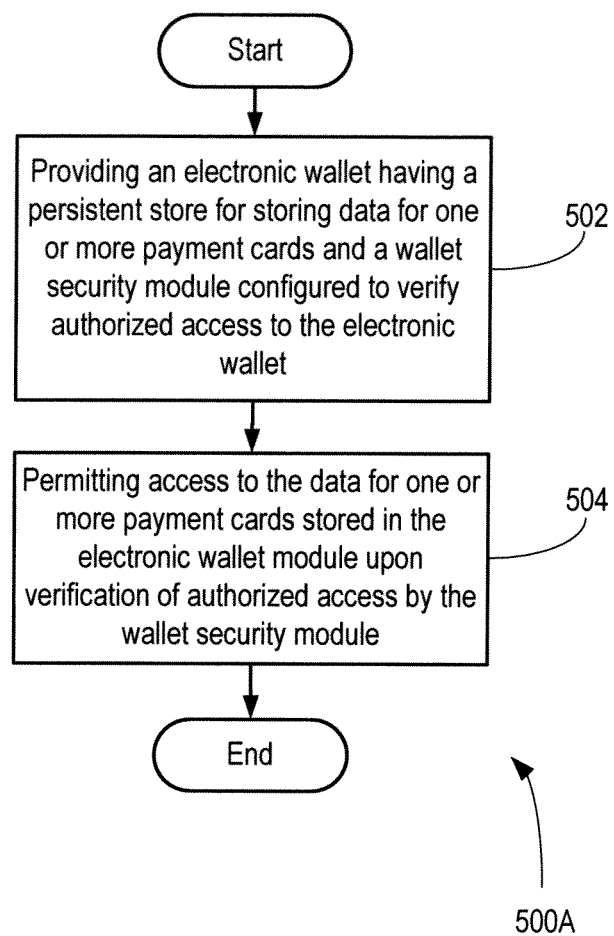
FIGS. 5A and 5B show schematic flowcharts of an illustrative method in accordance with an embodiment.
Figure 5B:
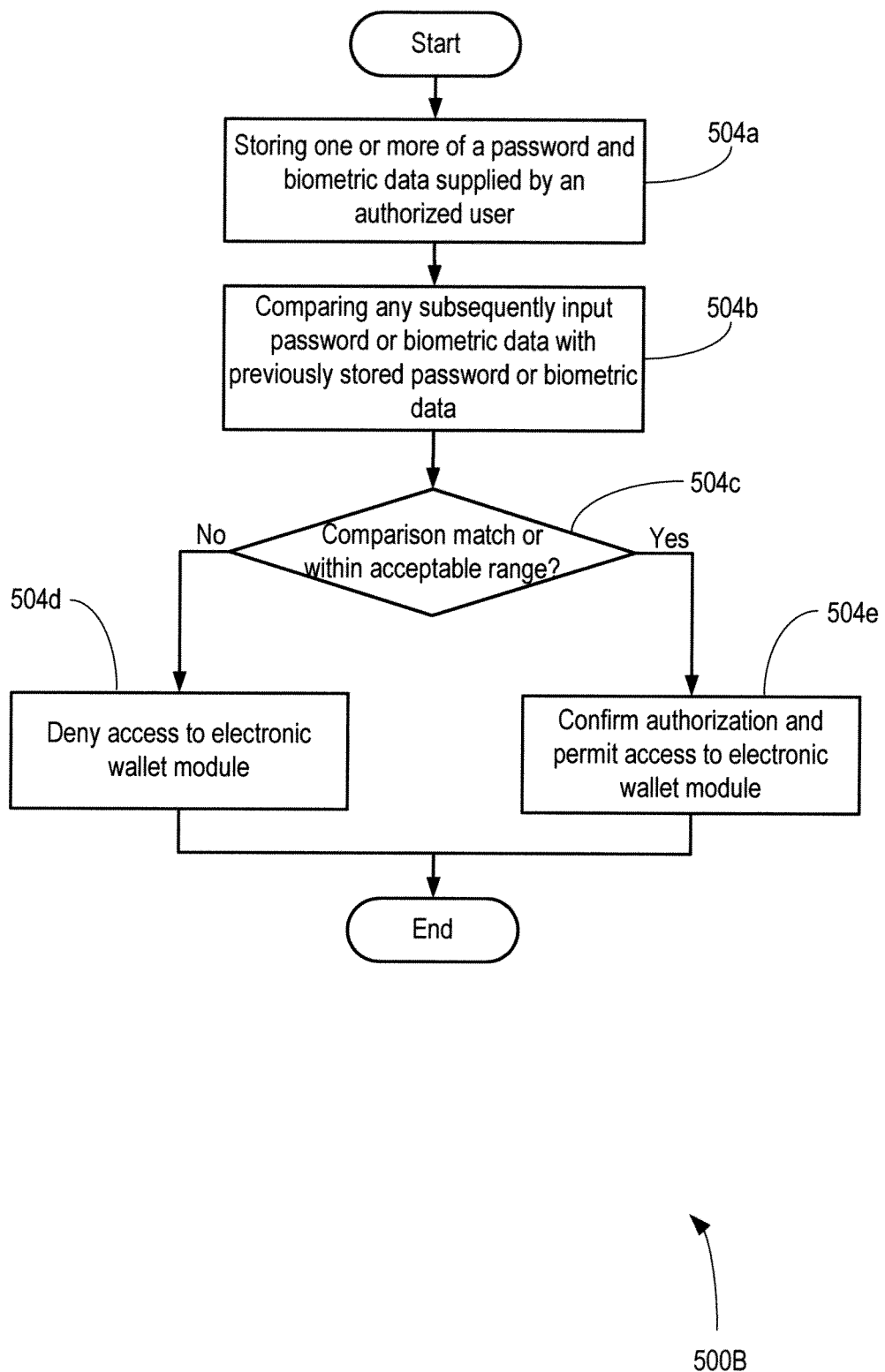

Now referring to FIGS. 5A and 5B, shown are schematic flowcharts of an illustrative method 500 in accordance with an embodiment. As shown in FIG. 5A, method 500A begins and at block 502 provides an electronic wallet, the electronic wallet having a persistent store for storing data for one or more payment cards and a wallet security module configured to verify authorized access to the electronic wallet. Method 500 then proceeds to block 504, where method 500 permits access to the data for one or more payment cards stored in the electronic wallet upon verification of authorized access by the wallet security module.

Block 504 is shown in more detail in FIG. 5B, where method 500B begins at block 504*a*, and stores authentication data comprising one or more of a password or biometric data, such as fingerprint or voice data supplied by an authorized user. Method 500B then proceeds to block 504*b*, where method 500 compares any subsequently input password or biometric data with a previously stored password or biometric data. Method 500B then proceeds to decision block 504*c*, where method 500 determines if the comparison between the previously stored authentication data and the subsequently input password or biometric data is within an acceptable range of variation. If no, method 500B proceeds to block 504*d*, where method 500B denies access to the electronic wallet and the method ends. If yes, method 500B proceeds to block 504*e*, where method 500B confirms authorization and allows access to the electronic wallet. Method 500B then ends.

As discussed above, the biometric data may be stored fingerprint data, or a voiceprint input signal supplied by an authorized user. As will be appreciated, method 500B may be adapted accordingly to compare any subsequently input fingerprint input signal or a voiceprint input signal with the fingerprint input signal and a voiceprint input signal previously supplied by the authorized user and stored in the wallet security module.

Thus, in an aspect, there is provided a method of making an electronic payment from a wireless mobile device, comprising: storing data for one or more payment cards in an electronic wallet provided in the wireless mobile device; upon invocation of the electronic wallet by an external application, authenticating a current user of the wireless mobile device for authorizing access to the electronic wallet; and upon successful authentication of the current user, providing data for one or more payment cards stored in the electronic wallet to the external application.

In an embodiment, the wireless mobile device includes an Internet browser, and the method further comprises invoking the electronic wallet with an external web application originating from an online vendor website.

In another embodiment, the method further comprises receiving instructions embedded in a webpage originating from the online vendor website to invoke the electronic wallet.

In another embodiment, the instructions comprise one of meta-tags, mark-up or custom content types embedded in the webpage HTTP.

In another embodiment, the external application is a catalogue application executing on the wireless mobile device, and the electronic wallet is invoked upon selection of a menu option for payment using the electronic wallet.

In another embodiment, authenticating the current user comprises authenticating one or more of a password or previously supplied biometric data for an authorized user.

In another embodiment, the biometric data is one or more of a fingerprint input signal or a voiceprint input signal, and the method further comprises authenticating the current user by comparing one or more of the fingerprint input signal or the voiceprint input signal with one or more of a fingerprint input signal and a voiceprint input signal previously supplied by the authorized user and stored in the electronic wallet.

In another embodiment, the method further comprises transmitting confirmation of authentication of the current user together with the data for one or more payment cards stored in the electronic wallet to the external application.

In another embodiment, the wireless mobile device includes a unique electronic serial number (ESN), a product identification number (PIN), or a telephone number, and the method further comprises transmitting one or more of the unique ESN, PIN or telephone number together with the data for the selected payment card to verify an authorized wireless mobile device.

In another embodiment, the method further comprises: encrypting the payment card data in the electronic wallet; passing the encrypted payment card data through an intermediate vendor system; decrypting the payment card data at a payment verification facility; and returning a payment authorization code to the vendor system to confirm payment.

In another aspect, there is provided a system for making an electronic payment from a wireless mobile device, the system having processing means and memory adapted to: store data for one or more payment cards in an electronic wallet provided in the wireless mobile device; authenticate a current user of the wireless mobile device for authorizing access to the electronic wallet upon invocation of the electronic wallet by an external application; and provide data for one or more payment cards stored in the electronic wallet to the external application upon successful authentication of the current user.

In an embodiment, the wireless mobile device includes an Internet browser, and the system is further adapted to invoke the electronic wallet with an external web application originating from an online vendor website.

In another embodiment, the system is further adapted to receive instructions embedded in a webpage originating from the online vendor website to invoke the electronic wallet.

In another embodiment, the instructions comprise one of meta-tags, mark-up or custom content types embedded in the webpage HTTP.

In another embodiment, the external application is a catalogue application executing on the wireless mobile device, and the electronic wallet is invoked upon selection of a menu option for payment using the electronic wallet.

In another embodiment, authenticating the current user comprises authenticating one or more of a password or previously supplied biometric data for an authorized user.

In another embodiment, the biometric data is one or more of a fingerprint input signal or a voiceprint input signal, and the system is further adapted to authenticate the current user by comparing one or more of the fingerprint input signal or the voiceprint input signal with one or more of a fingerprint input signal and a voiceprint input signal previously supplied by the authorized user and stored in the electronic wallet.

In another embodiment, the system is further adapted to transmit confirmation of authentication of the current user together with the data for one or more payment cards stored in the electronic wallet to the external application.

In another embodiment, the wireless mobile device includes a unique electronic serial number (ESN), a product identification number (PIN), or a telephone number, and the system is further adapted to transmit one or more of the unique ESN, PIN or telephone number together with the data for the selected payment card to verify an authorized wireless mobile device.

In another embodiment, the system is further adapted to: encrypt the payment card data in the electronic wallet; pass the encrypted payment card data through an intermediate vendor system; decrypt the payment card data at a payment verification facility; and return a payment authorization code to the vendor system to confirm payment.

In another aspect, there is provided a method for making an electronic payment from a wireless mobile device, comprising: storing data for one or more payment cards in an electronic wallet provided in the wireless mobile device; receiving a request from an external application to invoke the electronic wallet; authenticating a current user of the wireless mobile device, using one or more of a password or previously supplied biometric data for an authorized user, for authorizing access to the electronic wallet upon invocation; and providing data for one or more payment cards stored in the electronic wallet to the external application upon successful authentication of the current user.

In an embodiment, the biometric data is one or more of a fingerprint input signal or a voiceprint input signal, and the method further comprises authenticating the current user by comparing one or more of the fingerprint input signal or the voiceprint input signal with one or more of a fingerprint input signal and a voiceprint input signal previously supplied by the authorized user.

In another aspect, there is provided a data processor readable medium storing data processor code that when loaded onto a wireless mobile device adapts the device to make an electronic payment from a wireless mobile device, the data processor readable medium comprising: code for storing data for one or more payment cards in an electronic wallet provided in the wireless mobile device; code for authenticating a current user of the wireless mobile device for authorizing access to the electronic wallet upon invocation of the electronic wallet by an external application; and code for providing data for one or more payment cards stored in the electronic wallet to the external application upon successful authentication of the current user.

While illustrative embodiments have been described above, it will be appreciated that various changes and modifications may be made. More generally, the scope of the invention is defined by the following claims.

The invention claimed is:

1. An electronic device, comprising:
   an electronic wallet registered as a browser plug-in for a custom content type in an Internet browser;
   a memory, in communication with said electronic wallet, for storing data for at least one payment card;
   a communication subsystem; and a processor in communication with said electronic wallet, memory and communication subsystem, the processor being configured to:
- execute operations of a transcoding proxy to process an online payment form received from a website of an online vendor via the communication subsystem and to invoke the electronic wallet for accessing, from the memory, data for a selected one of the at least one payment card, the transcoding proxy configured to obtain said data from the electronic wallet; and
- execute operations of the transcoding proxy to convert display of the online payment form into a user interface control, to receive a designation of the selected one of the at least one payment card in the user interface control, and to populate the online payment form with said data, the user interface control configured to allow a user to conduct a purchase with the online payment form.

2. The electronic device of claim 1, further comprising a wallet security module in communication with the processor, the wallet security module configured to authorize access to the electronic wallet prior to the transcoding proxy obtaining said data.

3. The electronic device of claim 1, wherein the designation confirms a pre-selection of said selected one of the at least one payment card for use with said online vendor.

4. The electronic device of claim 1, wherein the designation confirms a pre-selection of said selected one of the at least one payment card for use with said website.

5. The electronic device of claim 1, wherein the transcoding proxy invokes the electronic wallet by invoking an application received by the transcoding proxy.

6. The electronic device of claim 5, wherein the application comprises a web application.

7. The electronic device of claim 5, wherein the processor is further configured to receive instructions embedded in a webpage received from said website to invoke execution of the application.

8. The electronic device of claim 1, wherein the electronic wallet is invoked upon selection of a menu option for payment using the electronic wallet.

9. The electronic device of claim 1, wherein the processor is further configured to transmit the online payment form thus populated to the website.

10. A method, comprising:
- a wallet security module authorizing controlled access to an electronic wallet of a wireless mobile device by a user inputting at least one of an electronic serial number of the wireless mobile device and a product identification number of the wireless mobile device into the wireless mobile device, and subsequent to authorizing:
- a transcoding proxy processing an online payment form received from a website of an online vendor;
- the transcoding proxy invoking the electronic wallet for accessing data stored for a selected one of at least one payment card, the data for the at least one payment card being stored in a memory of the wireless mobile device;
- the transcoding proxy obtaining said data for the selected one of the at least one payment card from the electronic wallet;
- the transcoding proxy receiving a designation from a user interface control;
- the transcoding proxy, in response to receiving the designation, populating said data in said online payment form for the selected one of the at least one payment card; and
- the transcoding proxy converting display of the online payment form into the user interface control, the user interface control configured to allow a user to conduct a purchase with the online payment form.

11. The method of claim 10, further comprising storing the at least one payment card in the electronic wallet.

12. The method of claim 10, wherein the wallet security module authorizes access to the electronic wallet prior to the transcoding proxy obtaining said data.

13. The method of claim 10, wherein the designation confirms a pre-selection of said selected one of the at least one payment card for use with said online vendor.

14. The method of claim 10, wherein the designation confirms a pre-selection of said selected one of the at least one payment card for use with said website.

15. The method of claim 10, wherein invoking the electronic wallet comprises invoking an application received by the transcoding proxy.

16. The method of claim 15, wherein the application comprises a web application.

17. The method of claim 15, wherein the application is invoked in response to instructions embedded in a webpage received from said website.

18. The method of claim 10, wherein the electronic wallet is invoked upon selection of a menu option for payment using the electronic wallet.

19. The method of claim 10, further comprising transmitting the online payment form thus populated to the website.

20. A computer program product comprising a non-transitory computer readable medium bearing code which, when executed by one or more processors of a device, causes said device to carry out the method of:
- a wallet security module on said device authorizing controlled access to an electronic wallet on said device using at least one of an electronic serial number of said device and a product identification number of said device;
- a transcoding proxy executing on said device processing an online payment form received from a website of an online vendor;
- the transcoding proxy invoking the electronic wallet for accessing data stored for a selected one of at least one payment card, the at least one payment card being stored in an electronic wallet in a memory of an electronic device;
- the transcoding proxy obtaining said data for the selected one of the at least one payment card from the electronic wallet;
- the transcoding proxy receiving a designation from a user interface control;
- the transcoding proxy, in response to receiving the designation, populating said data in said online payment form for the selected one of the at least one payment card; and
- the transcoding proxy converting display of the online payment form into the user interface control, the user interface control configured to allow a user to conduct a purchase with the online payment form.

* * * * *